United States Patent
Kim (10) Patent No.: US 12,049,722 B2
(45) Date of Patent: Jul. 30, 2024

(54) WASHING MACHINE AND CONTROL METHOD OF WASHING MACHINE

(71) Applicant: LG Electronics Inc., Seoul (KR)

(72) Inventor: Han Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 17/623,409

(22) PCT Filed: Jun. 26, 2020

(86) PCT No.: PCT/KR2020/008320
§ 371 (c)(1),
(2) Date: Dec. 28, 2021

(87) PCT Pub. No.: WO2020/263003
PCT Pub. Date: Dec. 30, 2020

(65) Prior Publication Data
US 2022/0349110 A1    Nov. 3, 2022

(30) Foreign Application Priority Data

Jun. 28, 2019  (KR) .......................... 10-2019-0078231

(51) Int. Cl.
*D06F 39/08*     (2006.01)
*D06F 33/38*     (2020.01)
(Continued)

(52) U.S. Cl.
CPC ............ *D06F 39/088* (2013.01); *D06F 33/38* (2020.02); *D06F 33/40* (2020.02); *D06F 39/04* (2013.01);
(Continued)

(58) Field of Classification Search
CPC ........ D06F 33/38; D06F 39/088; D06F 33/40; D06F 35/006; D06F 39/083; D06F 39/04;
(Continued)

(56) References Cited

U.S. PATENT DOCUMENTS

2017/0096768 A1* 4/2017 Kim .................... D06F 33/32
2017/0145621 A1* 5/2017 Sumer .................. D06F 37/02
(Continued)

FOREIGN PATENT DOCUMENTS

CN    103459701    12/2013
CN    103562459    2/2014
(Continued)

OTHER PUBLICATIONS

Machine translation of KR20180076565A1 to Jin, Jul. 2018. (Year: 2018).*

(Continued)

*Primary Examiner* — Benjamin L Osterhout
(74) *Attorney, Agent, or Firm* — Fish & Richardson P.C.

(57) ABSTRACT

A control method of a washing machine includes performing a first drum operation of supplying water by a first set amount together with a detergent into the tub and rotating the drum at a first drum rotation speed, while water is supplied, performing a pump speed-change operation of accelerating the pump from a first pump rotation speed to a second pump rotation speed and then decelerating to the first pump rotation speed at least once during the first drum operation and performing a second drum operation of operating a heater to heat the water in the tub in a state in which the first set amount of water is supplied into the tub, rotating the drum at a second drum rotation speed during the operation of the heater, and performing a pump constant-speed operation of operating the pump at a third pump rotation speed during the second drum operation.

20 Claims, 6 Drawing Sheets

(51) Int. Cl.
  *D06F 33/40*        (2020.01)
  *D06F 39/04*        (2006.01)
  *D06F 23/06*            (2006.01)
  *D06F 35/00*            (2006.01)
  *D06F 105/02*           (2020.01)
  *D06F 105/06*           (2020.01)
  *D06F 105/10*           (2020.01)
  *D06F 105/48*           (2020.01)

(52) U.S. Cl.
  CPC ............ *D06F 23/06* (2013.01); *D06F 35/006* (2013.01); *D06F 39/083* (2013.01); *D06F 2105/02* (2020.02); *D06F 2105/06* (2020.02); *D06F 2105/10* (2020.02); *D06F 2105/48* (2020.02); *Y02B 40/00* (2013.01)

(58) Field of Classification Search
  CPC .. D06F 2105/10; D06F 23/06; D06F 2105/48; D06F 2105/02; D06F 2105/06; Y02B 40/00
  See application file for complete search history.

(56) References Cited

U.S. PATENT DOCUMENTS

| | | | |
|---|---|---|---|
| 2017/0342627 A1 | 11/2017 | Kim | |
| 2019/0323161 A1* | 10/2019 | Im | D06F 33/00 |
| 2020/0063313 A1* | 2/2020 | Kim | D06F 33/36 |

FOREIGN PATENT DOCUMENTS

| | | | |
|---|---|---|---|
| DE | 102015214803 | | 2/2017 |
| EP | 1619284 | | 1/2006 |
| EP | 2728048 | | 1/2017 |
| JP | 2009-066295 | | 4/2009 |
| JP | 2010-036016 | | 2/2010 |
| JP | 2012-170694 | | 9/2012 |
| JP | 5053723 | | 10/2012 |
| KR | 20070009193 | | 1/2007 |
| KR | 20160044901 | | 4/2016 |
| KR | 20180076565 | A1 * | 7/2018 |
| KR | 20190006057 | | 1/2019 |
| KR | 20190101266 | A1 * | 8/2019 |
| WO | WO 2013/008362 | | 1/2013 |

OTHER PUBLICATIONS

Machine translation of KR20190101266A1 to Kim, Aug. 2019. (Year: 2019).*
Office Action in Australian Appln. No. 2020305579, mailed on Jun. 28, 2023, 6 pages.
Office Action in Chinese Appln. No. 202080047531.X, mailed on Mar. 23, 2023, 18 pages (with English translation).
Extended European Search Report in European Appln. No. 20830801.5, mailed on Jun. 15, 2023, 9 pages.
International Search Report in International Appln. No. PCT/KR2020/008320, dated Oct. 15, 2020, 6 pages (with English translation).

* cited by examiner

| cycle | washing cycle(S1) | | | first rinsing cycle(S2) | | | second rinsing cycle(S3) | | | spin-dry cycle(S4) | |
|---|---|---|---|---|---|---|---|---|---|---|---|
| | washing water supply (S11) | heat washing (S12) | rinse and spin-dry (S21) | water supply (S22) | rinse (S23) | drain (S31) | water supply (S32) | rinse (S33) | main spin-dry (S41) | cloth unwind (S42) |
| time | 4 minutes | 8 minutes | 12 minutes | 3 minutes | one minute | one minute | 2 minutes | one minute | 12 minutes | one minute |
| drum operation method | rolling | tumbling | spin-dry rotation | tumbling | tumbling | | tumbling | tumbling | spin-dry rotation | tumbling |
| drum rotation speed(rpm) | 35 | 40 | 750 | 46 | 46 | 0 | 46 | 46 | 750 | 46 |
| actual operation rate of washing motor | 6"/8" | 16"/4" | | 25"/9" | 21"/9" | | 25"/9" | 21"/9" | | 7"/3" |
| actual operation rate of circulation pump | Full On | synchronization with washing motor | | 20"/10" | Full On | | 20"/10" | Full On | | |
| circulation pump operation method | speed shifting operation, 0.5~1.1A | constant speed operation, 1.1A | | speed shifting operation, 0.5~1.1A | constant speed operation, 0.5A | | speed shifting operation, 0.5~1.1A | constant speed operation, 0.5A | | |
| operation method(1) | 17 | | | 36 | | | 29 | | | |

WASHING MACHINE AND CONTROL METHOD OF WASHING MACHINE

CROSS-REFERENCE TO RELATED APPLICATIONS

This application is a National Stage application under 35 U.S.C. § 371 of International Application No. PCT/KR2020/008320, filed on Jun. 26, 2020, which claims the benefit of Korean Patent Application No. 10-2019-0078231, filed on Jun. 28, 2019. The disclosures of the prior applications are incorporated by reference in their entirety.

BACKGROUND OF THE DISCLOSURE

Field of the Disclosure

The present disclosure relates to a washing machine and a control method of a washing machine, and more particularly, to a washing machine in which washing performance is improved by controlling a speed of a circulation pump, and a control method of a washing machine.

Related Art

Japanese Patent Application Laid-Open No. 2010-36016 (hereinafter referred to as a "related art") discloses a washing machine having a rotating drum installed in a water tank and having a circulation pump for circulating water discharged from the water tank. The circulation pump is capable of controlling a rotational speed, and a vertical angle and a horizontal diffusion degree of circulating water discharged into the drum are adjusted according to a rotational speed of the circulation pump.

Meanwhile, for effective washing, chemical action by a detergent is important in addition to physical action such as a fall of laundry caused by the rotation of the drum and friction between the laundry and the drum or lifter. In particular, it is necessary to prepare an improved method for effectively applying water in which a detergent is dissolved (hereinafter, referred to as 'detergent water') to the laundry at an initial stage of washing.

SUMMARY

The present disclosure provides a control method of a washing machine to improve washing performance by allowing detergent water to be effectively applied to laundry.

The present disclosure also provides a control method of a washing machine in which detergent water having a high concentration may be evenly applied to laundry during soaking at an initial stage of washing.

The present disclosure also provides a control method of a washing machine to simultaneously apply heat and chemical action based on high-temperature detergent water and mechanical force based on drum rotation to laundry at an initial stage of washing.

The present disclosure relates to a washing machine having a drum rotating in a tub and a nozzle spraying water discharged from the tub and circulated by a pump into the drum, and a control method of a washing machine.

The washing machine may include a tub for storing water, a drum rotatably provided in the tub, a driving unit rotating the drum, a water supply unit supplying water supplied from an external water source to the tub, a pump having a pump motor and pressure-feeding water discharged from the tub, a nozzle spraying the water pressure-fed by the pump into the drum, a heater heating the water in the tub, and a controller controlling the driving unit, the water supply unit, and the pump motor, and the heater.

The washing machine may further include a casing forming an exterior of the washing machine. The tub may be disposed in the casing. The casing may include a cabinet having an open front surface, a left surface, a right surface, and a rear surface.

A central axis of rotation on which the drum rotates may be disposed on a straight line passing through the rear surface of the cabinet. The drum may be rotated about a horizontal axis of rotation in the tub.

The nozzle may be provided in plurality.

The water supply unit may include a water supply pipe receiving water from an external water source, a water supply valve controlling the water supply pipe, and a dispenser accommodating a detergent and connected to the water supply pipe and the tub.

The controller may control the water supply unit to supply water by a first set amount to the tub. The controller may control the driving unit so that the drum rotates at a first drum rotation speed while water is supplied. The controller, while the drum rotates, may perform an operation of accelerating a rotation speed of the pump motor from a first pump rotation speed to a second pump rotation speed and then decelerating the rotation speed from the second pump rotation speed to the first pump rotation speed, at least once. When supplying the water by the first set amount to the tub, the controller may control the water supply valve to supply the water supplied to the water supply pipe to the tub via the dispenser. When water is supplied to the tub by the first set amount, the detergent accommodated in the dispenser and water may be supplied to the tub together.

The controller may operate the heater in a state in which the first set amount of water is supplied. The controller may control the driving unit to rotate the drum at a second drum rotation speed, while operating the heater. The controller may rotate the pump motor at a third pump rotation speed, while the drum rotates at the second drum rotation speed.

The controller may control the driving unit so that the drum alternately rotates and stops at the first drum rotation speed, while the water is supplied. A ratio of a rotation time and a stop time of the drum may be 6:8.

The controller may control the driving unit so that the drum is rotated and stopped repeatedly, when rotating the drum while the heater is operated. The controller may repeat the rotation and stopping of the pump motor, and synchronize the rotation and stopping of the pump motor with the rotation and stopping of the drum.

The controller may control the driving unit to rotate the drum at the second drum rotation speed, and then control the driving unit to rotate the drum at a preset spin-drying speed.

The controller may control the driving unit so that the drum is rotated at a third drum rotation speed, while supplying water into the tub after rotating the drum at the spin-drying speed. While the drum is rotated at the third drum rotation speed, the controller may perform an operation of accelerating a rotation speed of the pump motor from the first pump rotation speed to the second pump rotation speed and then decelerating to the first pump rotation speed at least once.

When controlling the drum to rotate at the third drum rotation speed after rotating the drum at the spin-drying speed, the controller may control the driving unit so that the drum repeats rotation and stopping alternately at the third rotation speed. In a section in which the drum alternately rotates and stops at the third drum rotation speed, a ratio between a rotation time and a stop time of the drum may be 25:9.

When accelerating and decelerating the pump motor after rotating the drum at the spin-drying speed, the controller may repeat rotation and stopping of the pump motor alternately, a ratio of a rotation time and a stop time of the pump motor may be 20:10.

The controller may rotate the drum at the third drum rotation speed, and after accelerating and decelerating the pump motor, the controller may rotate the pump motor at a fourth pump rotation speed.

The control method may include: (a) step of performing a first drum operation of supplying water by a first set amount together with a detergent into the tub and rotating the drum at a first drum rotation speed, while water is supplied, at least once and performing a pump speed-change operation of accelerating the pump from a first pump rotation speed to a second pump rotation speed and then decelerating to the first pump rotation speed at least once during the first drum operation; and (b) step of performing a second drum operation of operating a heater to heat the water in the tub in a state in which the first set amount of water is supplied into the tub, rotating the drum at a second drum rotation speed at least once during the operation of the heater, and performing a pump constant-speed operation of operating the pump at a third pump rotation speed at least once during the second drum operation.

While the drum is rotating at the first drum rotation speed, the laundry positioned at the lowest point in the drum may rise to a certain height by the rotation of the drum and then roll down along an inner surface of the drum. The first drum rotation speed may be 36 rpm.

In step (a), a ratio of a rotation time and a stop time of the drum may be 6:8.

A current value applied to the pump during the pump constant-speed operation may be greater than or equal to a current value applied to the pump speed-change operation. The third pump rotation speed may be equal to or higher than the first and second pump rotation speeds.

In step (b), rotating the drum at the second drum rotation speed may be repeated. In the pump constant speed operation, the pump may be rotated at the third pump rotation speed, but the operation of the pump may be synchronized with the operation of the drum each time. In step (b), a ratio of a rotation time and a stop time of the drum may be 16:4.

The second drum rotation speed may be greater than the first drum rotation speed. The second drum rotation speed may be 40 rpm.

The control method may further include a first rinsing step performed after step (b). The first rinsing step may include a rinsing and spin-drying step of rotating the drum at a preset spin-drying speed to spin-dry laundry, and a water supply step of performing the pump speed shifting operation, while performing an operation of the drum at a third drum rotation speed, while supplying water into the tub at least once after the rinsing and spin-drying step. The third drum rotation speed may be greater than the second drum rotation speed.

A ratio of a rotation time and a stop time of the drum in the water supply step may be 25:9. In the pump speed shifting operation of the water supply step, a ratio of a rotation time and a stop time of the pump may be 20:10.

In the control method, the first rinsing step may further include a step of rotating the pump at a fourth pump rotation speed after the water supply step. The fourth pump rotation speed may be the same as the first pump rotation speed.

Advantageous Effects

First, the control method of a washing machine of the present disclosure has the effect of evenly applying the detergent water to the laundry in the drum by performing speed shifting operation on the circulation pump in the process of supplying the detergent water.

Second, since heating is performed in a state in which the detergent is evenly permeated into the laundry, heat and chemical action may directly affect the laundry, thereby improving washing power.

Third, a water flow sprayed through the nozzle is shifted in a front-rear direction of the drum through the control of the speed of the circulation pump, and accordingly, the water flow pushes out dirt on the laundry, thereby improving washing performance.

DESCRIPTION OF EXEMPLARY EMBODIMENTS

Advantages and features of the invention and methods to achieve the same are described more fully hereinafter with reference to the accompanying drawings in which embodiments are shown. This invention may, however, be embodied in many different forms and should not be construed as limited to the embodiments set forth herein. Rather, these embodiments are provided so that this disclosure is thorough, and will fully convey the scope of the invention to those skilled in the art and this invention is defined by the scope of the claims. Like reference numerals refer to like elements throughout the present specification.

Hereinafter, the present disclosure will be described in detail with reference to the accompanying drawings.

Figure 1:
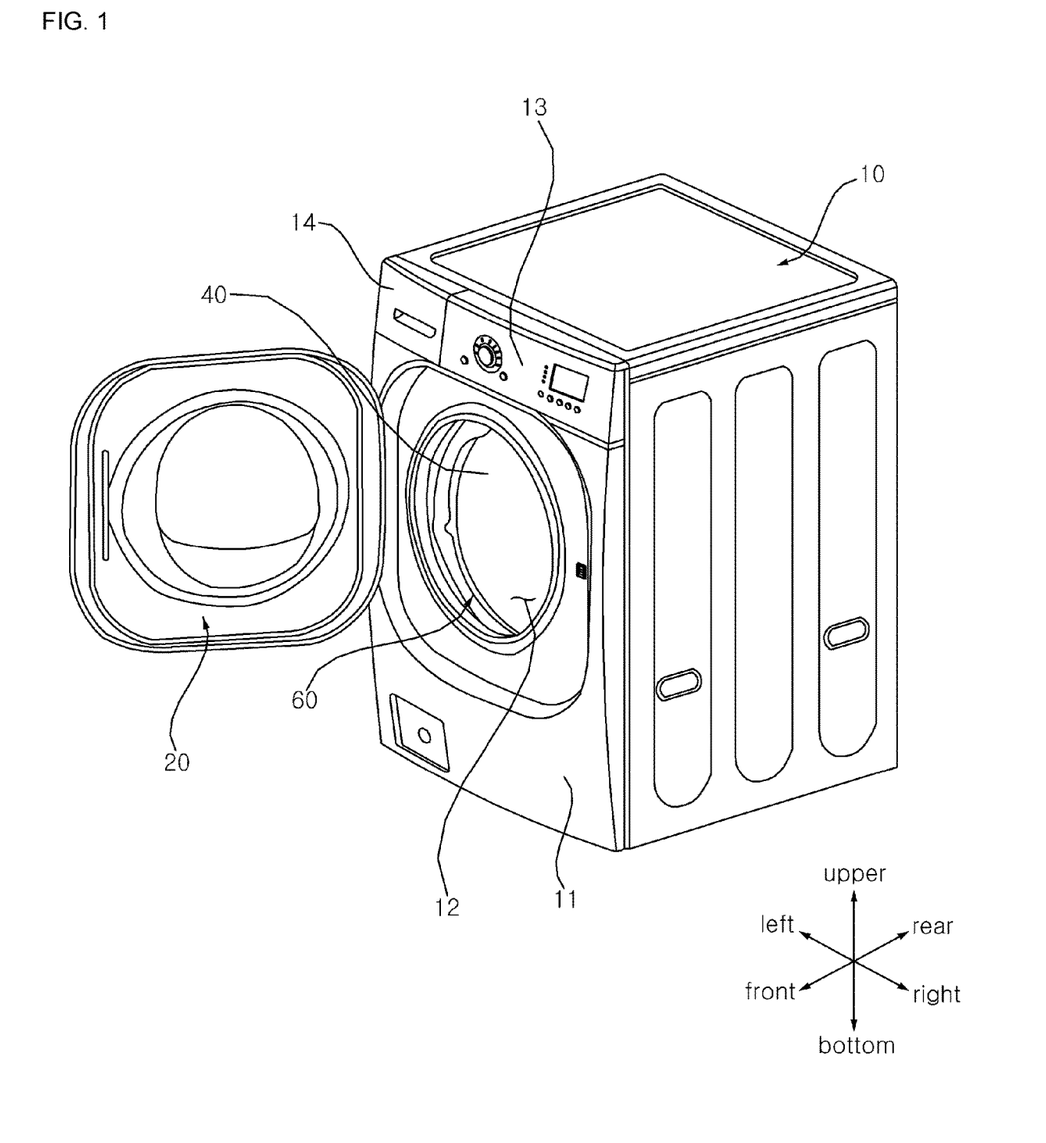
FIG. 1 is a perspective view illustrating a washing machine according to an embodiment of the present disclosure.
Figure 2:
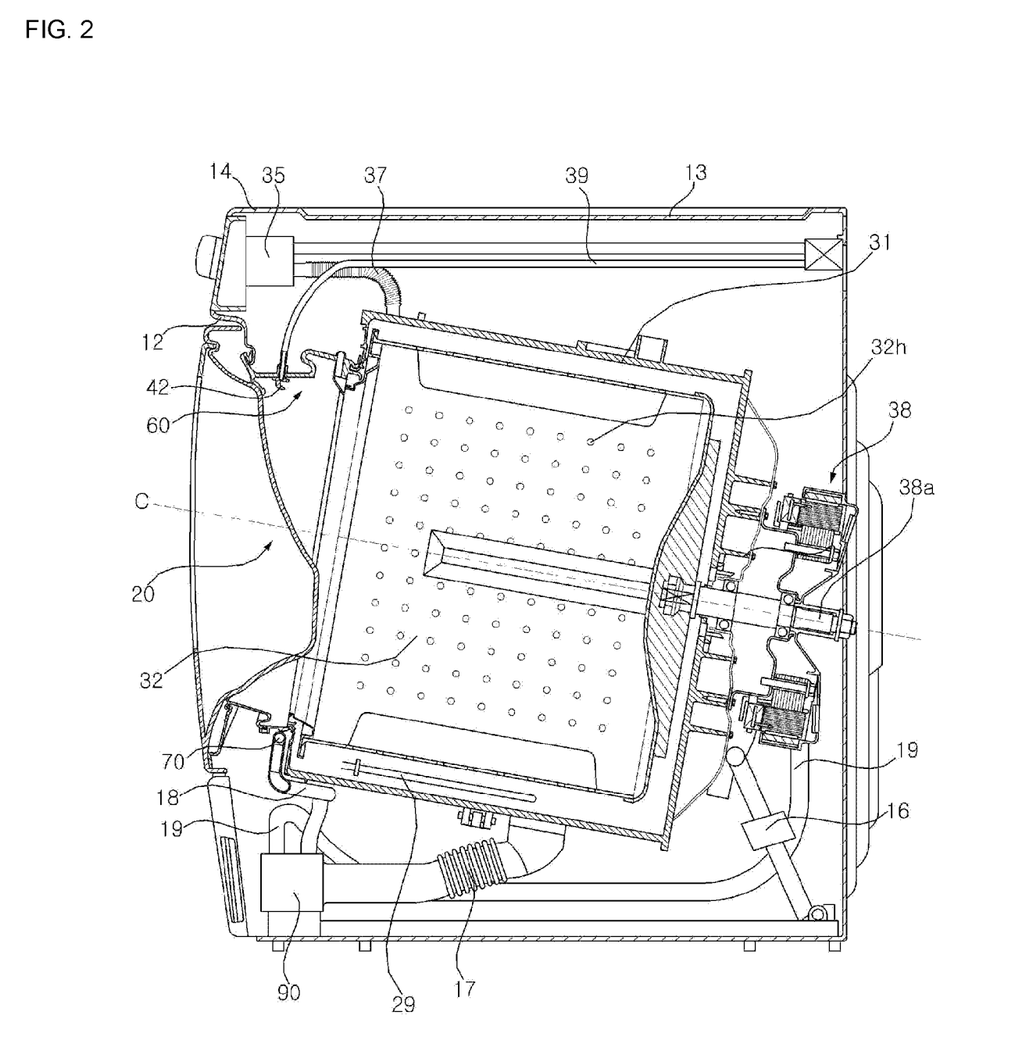
FIG. 2 is a side cross-sectional view illustrating an inside of the washing machine illustrated in FIG. 1.
Figure 3:
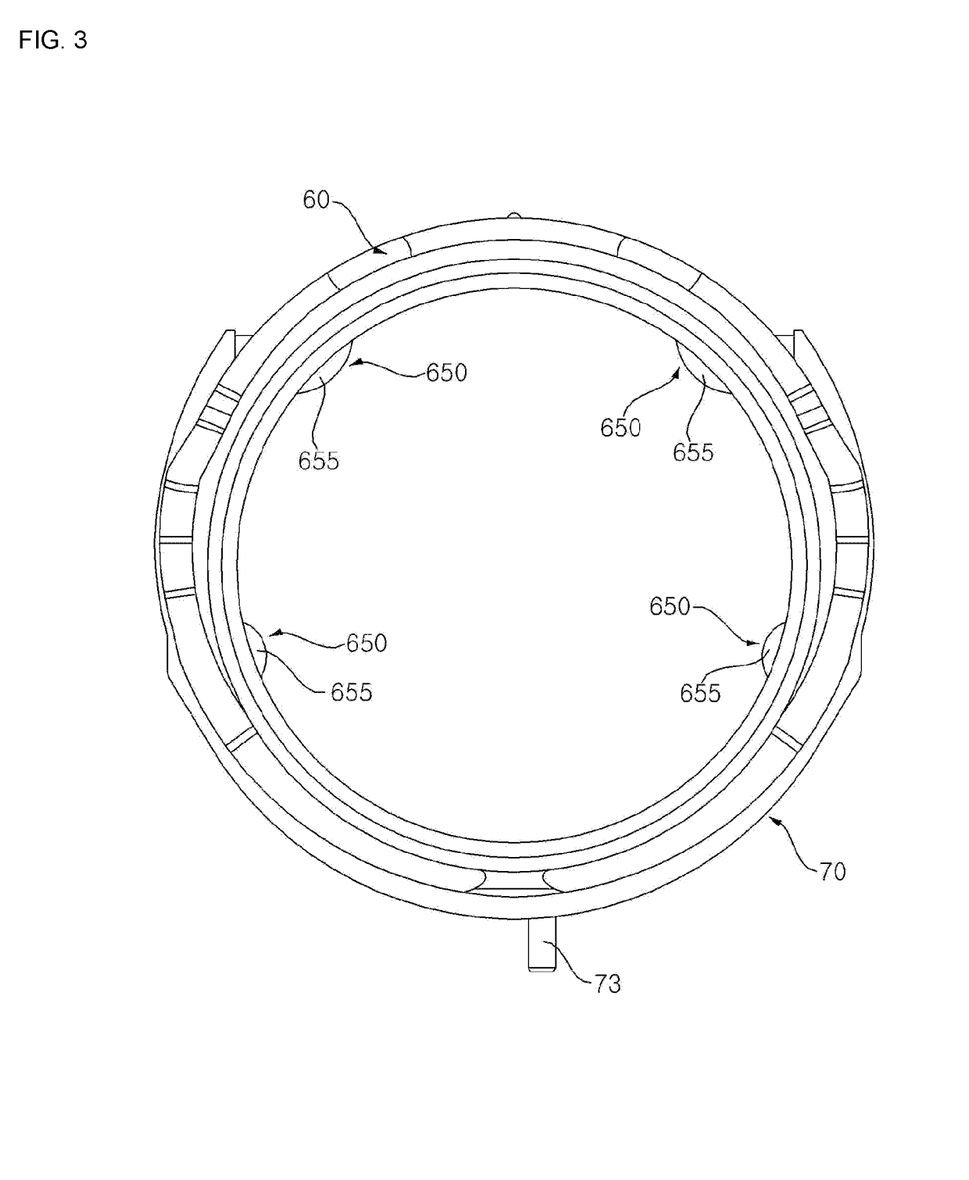
FIG. 3 is a perspective view illustrating a coupling state of a gasket and a distribution pipe illustrated in FIG. 2.
Figure 4:
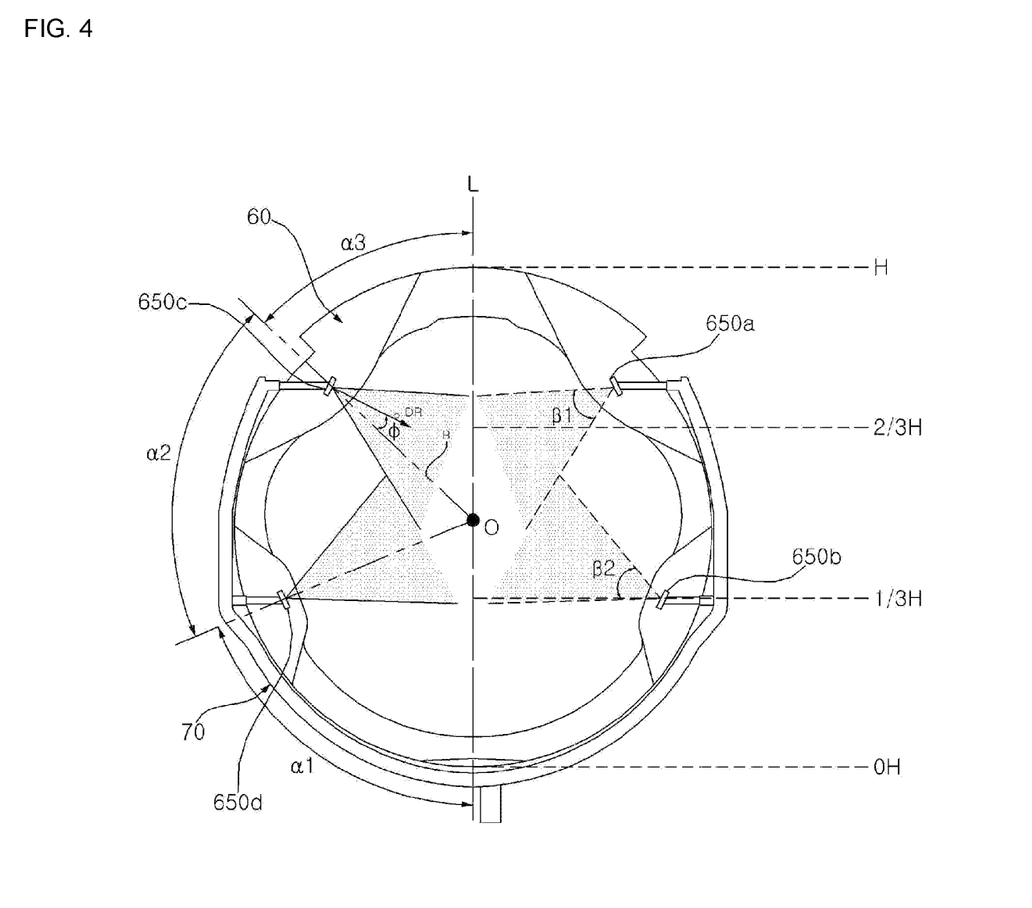
FIG. 4 is a rear view of a gasket, illustrating positions of nozzles and a spray form of each nozzle.

FIG. 1 is a perspective view illustrating a washing machine according to an embodiment of the present disclosure. FIG. 2 is a side cross-sectional view illustrating an inside of the washing machine illustrated in FIG. 1. FIG. 3 is a perspective view illustrating a coupling state of a gasket and a distribution pipe illustrated in FIG. 2. FIG. 4 is a rear view of a gasket, illustrating positions of nozzles and a spray form of each nozzle.

Referring to FIGS. 1 to 3, a casing 10 forms an exterior of a washing machine, and an inlet 12$h$ through which laundry is put is formed on a front surface. The casing 10 may include a cabinet 11 having an open front surface, a left surface, a right surface, and a rear surface and a front panel 12 coupled to the open front surface of the cabinet 11 and having the inlet 12h formed therein. Bottom and top surfaces of the cabinet 11 are open, and a horizontal base 15 supporting the washing machine may be coupled to the bottom surface. In addition, the casing 10 may further include a top plate 13 covering the open upper surface of the cabinet 11 and a control panel 14 disposed above the front panel 12.

A tub 31 containing water may be disposed inside the casing 10. The tub 31 has an entrance formed in the front so that laundry may be put therein. The cabinet 11 and the tub 31 are connected by an annular gasket 60. A door 20 for opening and closing the inlet 12h may be rotatably coupled to the casing 10.

A heater 29 for heating wash water may be provided in the tub 31. The heater 29 may be disposed outside the drum 31.

The gasket 60 is to prevent water contained in the tub 31 from leaking. The gasket 60 may extend from an annular front end to an annular rear end of the to form a tubular passage connecting the inlet 12h and the inlet of the tub 41. The front end of the gasket 60 may be fixed to the front panel 12 of the casing 10, and the rear end may be fixed around the entrance of the tub 31.

The gasket 60 may be formed of a flexible or elastic material. The gasket 60 may be formed of natural rubber or synthetic resin. The gasket 60 may be formed of a flexible material such as rubber. The gasket 60 may be formed of a material such as ethylene propylene diene monomer (EPDM) or thermo plastic elastomer (TPE). Hereinafter, a portion defining the inside of the tubular shape of the gasket 60 is referred to as an inner circumferential portion (or an inner circumferential surface) of the gasket 60, and the opposite portion is referred to as an outer circumferential portion (or an outer surface) of the gasket 60.

A drum 32 accommodating laundry may be rotatably provided in the tub 31. A plurality of through-holes 32h may be formed in the drum 32 so that water in the tub 31 may be introduced into the drum 32.

The drum 32 is arranged so that the entrance into which the laundry is put is located at the front, and rotates about a substantially horizontal rotation center line C. However, "horizontal" is not a term used in a mathematically strict sense. That is, the rotation center line C inclined at a predetermined angle with respect to the horizontality as in the embodiment may be considered as being substantially horizontal because it is also closer to horizontality rather than verticality. In other words, the rotation center line C may pass through the rear surface of the cabinet 11.

A plurality of lifters 34 may be provided on an inner surface of the drum 32. The plurality of lifters 34 may be disposed at a predetermined angle with respect to a center of the drum 32. When the drum 32 rotates, the laundry is lifted by the lifter 34 and then dropped repeatedly.

A driving unit 38 for rotating the drum 32 may be further provided, and a drive shaft 38a rotated by the driving unit 38 may pass through a rear surface of the tub 31 and be coupled to the drum 32.

Preferably, the driving unit 38 may include a direct-connected washing motor, and the washing motor may include a stator fixed to the rear of the tub 31 and a rotor rotated by magnetic force acting between the rotor and the stator. The drive shaft 38a may rotate integrally with the rotor.

The tub 31 may be supported by a damper 16 installed on the base 15. Vibration of the tub 31 induced when the drum 32 rotates is attenuated by the damper 16. Although not shown, according to the embodiment, a hanger (e.g., a spring) for suspending the tub 31 in the casing 10 may be further provided.

The water supply unit may supply water supplied from an external water source such as a faucet to the tub 31 or the drum. The water supply unit may include a water supply hose (not shown) for guiding water supplied from an external water source such as a faucet, a water supply pipe 34 for guiding the water supplied through the water supply hose to a dispenser 35, and a water supply valve 33 intermittently controlling the water supply pipe 34.

The dispenser 35 supplies additives such as detergent and fabric softener into the tub 31 or the drum 32. In the dispenser 35, additives may be classified and accommodated according to their types. The dispenser 35 may include a detergent accommodating portion (not shown) for accommodating the detergent and a softener accommodating portion (not shown) for accommodating the fabric softener.

The water supply pipe 34 may include at least one water supply pipe (not shown) for selectively guiding water supplied through the water supply valve 33 to each accommodating portion of the dispenser 35.

The gasket 60 may include a direct water nozzle 42 for spraying water into the drum 32, and a direct water supply pipe 39 for guiding the water supplied through the water supply valve 33 to the direct water nozzle 42.

Water discharged from the dispenser 35 is supplied to the tub 31 through a water supply bellows 37. A water supply port (not shown) connected to the water supply bellows 37 may be formed on a side surface of the tub 31.

A drain hole for discharging water may be formed in the tub 31, and a drain bellows 17 may be connected to the drain hole. A pump 90 for pumping water discharged from the tub 31 through the drain bellows 17 may be provided. A drain valve (not shown) for controlling the drain bellows 17 may be further provided.

In the embodiment, the pump 90 is a circulation pump for drainage and selectively performs a function of pressure-feed water discharged through the drainage bellows 17 to a drain pipe 19 and a function of pressure-feed water to a circulation pipe 18. Since a technique of selectively performing circulation and drainage using a single pump is already well known in the washing machine technology field, a detailed description thereof will be omitted.

However, the present disclosure is not limited thereto, and a drain pump for pressure-feeding water to the drain pipe 19 and a circulation pump for pressure-feeding water to the circulation pipe 18 may be provided separately.

Hereinafter, water pressure-fed by the pump 90 and guided along the circulation pipe 18 is referred to as circulating water.

The pump 90 enables a variable flow rate (or discharge water pressure). A pump motor (not shown) rotating an impeller (not shown) of the pump 90 may be a variable speed motor enabling controlling of a rotation speed. The pump motor may be a brushless direct current motor (BLDC), but is not necessarily limited thereto. A driver for controlling a speed of the pump motor may be further provided, and the driver may be an inverter driver. The inverter driver converts AC power into DC power and inputs the DC power to the motor at a target frequency.

A controller (not shown) for controlling the pump motor may be further provided. The controller may include a proportional-integral (PI) controller, a proportional-integral-derivative (PID) controller, and the like. The controller may receive an output value (e.g., output current) of the pump motor as an input, and control an output value of the driver so that a rotation speed of the pump motor follows a preset target rotation speed based thereon. The controller may control not only the rotation speed of the pump motor, but also a rotation direction.

Meanwhile, it should be understood that the controller may control an overall operation of the washing machine as well as the pump motor and each portion mentioned below is controlled by the controller.

Meanwhile, a nozzle 650 may be disposed on an inner circumferential surface of the gasket 60. The nozzles 650 may be provided in plurality. A plurality of protrusions 655 may be formed on an inner circumferential surface of the gasket 60, and nozzles 650a, 650b, 650c, and 650d may be formed on the protrusions 655, respectively.

A distribution pipe 701 for guiding the circulating water pressure-fed by the pump 90 to the plurality of nozzles 650 may be installed in the gasket 60. The distribution pipe 701 may have an entrance connected to the circulation pipe 18 and may have a plurality of exits for guiding water guided through the entrance to the plurality of nozzles 650.

The plurality of nozzles 650 may be classified into upper nozzles 650a and 650d and lower nozzles 650b and 650c according to a height from the gasket 60. In the embodiment, four nozzles 650a, 650b, 650c, and 650d are provided, which may include a first lower nozzle 650b and a second lower nozzle 650c disposed below the gasket 60 and a first upper nozzle 650a and a second upper nozzle 650d disposed above the lower 650b and 650c.

A water flow injected through each of the nozzles 650a, 650b, 650c, and 650d reaches a deeper portion of the drum 32 as water pressure supplied from the pump 90 is higher. That is, by controlling a rotation speed of the pump motor (hereinafter referred to as 'pump rotation speed'), a range of the water flow sprayed from the nozzles 650a, 650b, 650c, and 650d in the drum 32 may be controlled.

Figure 5:
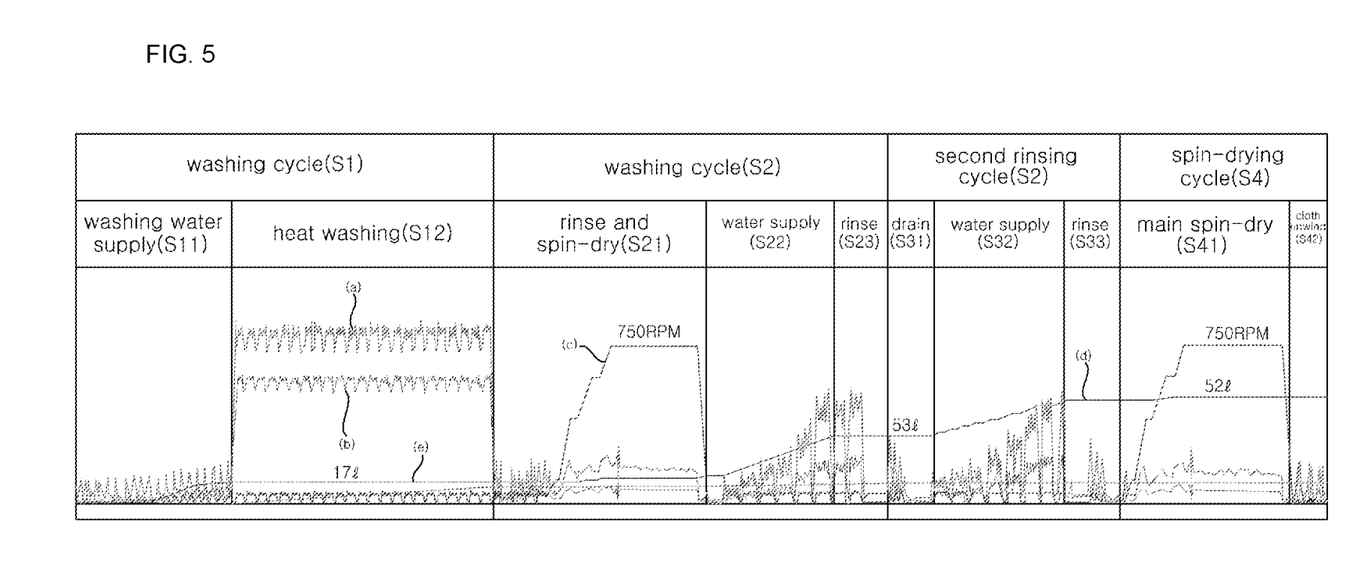
FIG. 5 is graphs referenced to describe a control method of a washing machine according to an embodiment of the present disclosure.

FIG. 5 is graphs referenced to describe a control method of a washing machine according to an embodiment of the present disclosure, in which (a) is current (W), (b) is electric power, C is a rotation speed of the drum, (d) is the amount of supplied water, and (e) represents electrical energy (Wh). In particular, the current a, the electric power c, and the electrical energy Wh indicate a total amount consumed by the washing motor, the pump motor, and the heater 29.

Figure 6:
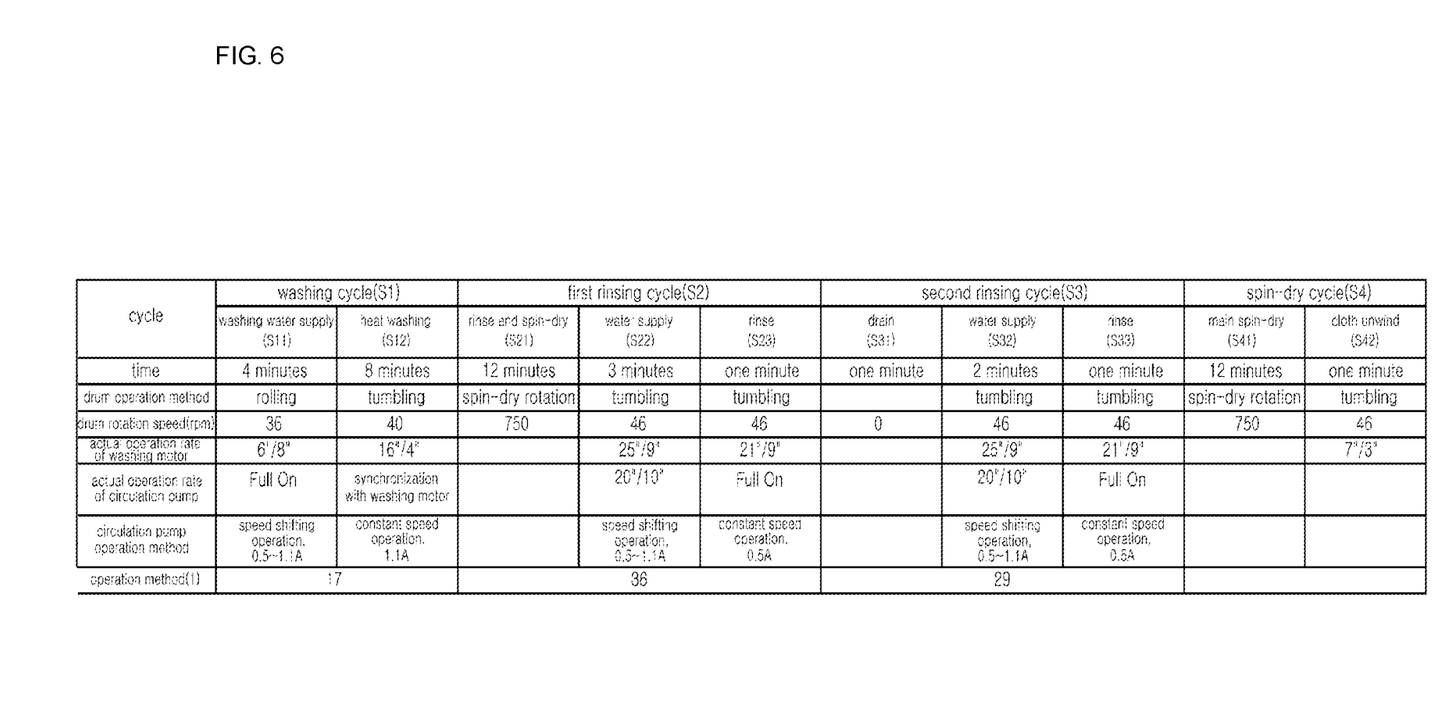
FIG. 6 is a table summarizing data referenced to describe a control method of a washing machine according to an embodiment of the present disclosure.

FIG. 6 is a table summarizing data referenced to describe a control method of a washing machine according to an embodiment of the present disclosure. Hereinafter, a control method of a washing machine according to an embodiment of the present disclosure will be described with reference to FIGS. 5 to 6.

The control method of a washing machine according to an embodiment of the present disclosure may include a washing cycle (51), a first rinsing cycle (S2), a second rinsing cycle (S3), and a spin-drying cycle (S4).

The first washing cycle (51) may include washing water supply (S11) and heat washing (S12). The washing water supply (S11) is a step of supplying water into the tub 31, in which the water supply valve 33 is opened under the control of a controller (not shown). Water is supplied to the dispenser 35 through the water supply pipe 34, and the additive (detergent) contained in the dispenser 35 may be discharged together with the water.

The controller may control various electric devices constituting the washing machine and may include a memory for storing a coded program and a processor for processing data by reading the memory. Hereinafter, it should be understood that 'control' is performed by the controller even if there is no particular mention.

At the time of washing water supply (S11), a first set amount (e.g., 17 liters (I)) of water is supplied into the tub 31, and a first drum operation is performed while the water is supplied in this manner. During the first drum operation, rotating the drum 32 at a first drum rotation speed (36 rpm in the table of FIG. 6) is performed at least once. In addition, while the first drum operation is being performed, the pump 90 is operated in a speed shifting manner (hereinafter, referred to as a 'pump speed shifting operation'). Here, the pump speed shifting operation is an operation of accelerating and then decelerating the pump 90 within a predetermined speed range, and such acceleration and deceleration may preferably be repeated.

Specifically, during the pump speed shifting operation, an operation of accelerating the pump 90 from a first pump rotation speed (e.g., a pump rotation speed when an input current of the pump motor is 0.5 A) to a second pump rotation speed (e.g., pump rotation speed when the input current of the pump motor is 1.1 A) and then decelerating to the first pump rotation speed is performed at least once.

A first current value is input to the pump motor in response to the first pump rotation speed, and a second current value is input in response to the second pump rotation speed, and the first current value may be, for example, 0.5 A, and the second current value may be, for example, 1.1 A. In other words, the current value input to the pump motor during the pump speed shifting operation may have a pattern of rising from 0.5 A to 1.1 A and then falling again to 0.5 A that repeats. A time required for the washing water supply (S11) may be approximately 4 minutes.

In the heat washing (S12), the heater 29 is operated in a state in which the first set amount of water is supplied into the tub 31, and the second drum operation is performed while the heater 29 is being operated. During the second drum operation, rotating the drum 32 at the second drum rotation speed (40 rpm in the table of FIG. 6) is performed at least once. Also, while the second drum operation is performed, the pump constant speed operation for rotating the pump 90 at a constant speed is performed at least once. During the pump constant speed operation, the pump 90 is rotated at a third pump rotation speed, and the third pump rotation speed may have the same value as the second pump rotation speed. For example, when a current of 1.1 A is applied to the pump motor, the pump motor may be rotated at the third pump rotation speed. The time required for heat washing (S12) may be approximately 8 minutes.

Meanwhile, while the drum 32 is rotated at the first drum rotation speed, the laundry located at the lowest point in the drum 32 may move in a manner of rising to a certain height by the rotation of the drum 32 and then rolling down along the inner surface of the drum 32. Hereinafter, the motion of the laundry is referred to as a rolling motion. The first drum rotation speed may be 36 rpm. Since the laundry rubs against the inner surface of the drum 32 or the lifter 34 while the rolling motion is induced, it has the same effect as rubbing the laundry.

The rotation of the drum 32 (i.e., rotation at the first drum rotation speed) causing the rolling motion during the washing water supply (S11) may be repeated a plurality of times. In this case, a ratio (t11:t12) of a time t11 for which the drum 32 is rotated once and a time t12 for which the drum 32 is stopped once may be 6:8. For example, a pattern in which current is applied to the washing motor for 6 seconds and then cut off for 8 seconds may be repeated.

Meanwhile, rotating the drum 32 at the second drum rotation speed in the heat washing (S12) may be repeatedly performed. The second drum rotation speed may be greater than the first drum rotation speed. In an embodiment, the second drum rotation speed may be 40 rpm.

In this case, a ratio (t21:t22) of a time t21 for which the drum 32 is rotated once and a time t22 for which the drum 32 is stopped once may be 16:4. For example, a pattern in which current is applied to the washing motor for 16 seconds and then cut off for 4 seconds may be repeated.

Rotating the pump 90 at the third pump rotation speed in the pump constant speed operation may be repeated. Here, the operation of the pump 90 when the pump 90 is rotated at the third pump rotation speed may be controlled to be synchronized with the operation of the drum 32. That is, a current may be applied to the pump motor in response to a current being applied to the washing motor, and a current applied to the pump motor may also be cut off in response to cutoff of the current applied to the washing motor.

The first rinsing step (S2) may include a rinsing and spin-drying step (S21), a water supply step (S22), and a rinsing step (S23). The rinsing and spin-drying step (S21) may be a step of spin-drying laundry by rotating the drum 32 at a preset spin-drying speed. As the laundry rotates while being adhered to the inner surface of the drum 32, spin-drying is performed.

The pump 90 may be operated in an open state of the drain valve. At this time, the pump 90 may be operated in a drain mode to discharge wash water through the drain pipe 19. In the rinsing and spin-drying step (S21), the drum 32 may be accelerated by stages to reach a spin-drying speed. However, the drum 32 may be accelerated to the spin-drying speed at a time, without being limited thereto. The spin-drying speed is preferably 750 rpm, but is not necessarily limited thereto. A time required for the rinsing and spin-drying (S21) may be approximately 12 minutes.

After the rinsing and spin-drying step (S21), the water supply step (S22) may be performed. In the water supply step (S22), water as much as a second set amount (e.g., 53 liters (I)) is supplied into the tub 31, and in this process, the drum 32 may be operated at a third drum rotation speed (46 rpm in the table of FIG. 6) at least once. The third drum rotation speed may be greater than the second drum rotation speed.

While the drum 32 is rotated at the third drum rotation speed, the laundry located at the lowest point in the drum 32 may move in a pattern of rising to a certain height by the rotation of the drum 32 and then being separated from the inner surface of the drum 32 to fall. Hereinafter, such a motion of the laundry is referred to as a tumbling motion. The third drum rotation speed may be 46 rpm. Since the tumbling motion causes the laundry to fall, it has the same effect as washing the laundry by tapping.

During water supply (S22, the rotation of the drum 32 (i.e., rotation at the third drum rotation speed) causing the tumbling motion may be repeated a plurality of times. In this case, a ratio (t31:t32) of a time t31 for which the drum 32 is rotated once and a time t32 for which the drum 32 is stopped once may be 25:9. For example, a pattern in which current is applied to the washing motor for 25 seconds and then cut off for 9 seconds may be repeated.

In the water supply step (S22), the pump 90 may be operated in a speed shifting manner. At this time, the current value applied to the pump motor may vary between 0.5 A and 1.1 A. In the water supply step (S22), the speed shifting operation of the pump 90 may be repeated at regular time intervals. For example, a current having a pattern of increasing from 0.5 A to 1.1 A and then falling back to 0.5 A at least once is applied to the pump 90 for a predetermined time t41 and then cut off for a predetermined time t42. Here, t41: t42 may be 20:10. For example, a pattern in which current is applied to the pump 90 for 20 seconds and then cut off for 10 seconds may be repeated. A time required for water supply (S22) may be approximately 3 minutes.

After the water supply step (S22), a rinsing step (S23) may be performed.

In the water supply step (S22), water is supplied into the tub 31, and in this process, driving the drum 32 at the third drum rotation speed may be performed at least once.

While the drum 32 is rotated at the third drum rotation speed, the laundry located at the lowest point in the drum 32 may move in a form of rising to a certain height by the rotation of the drum 32 and then being separated from the inner surface of the drum 32 and falling. Hereinafter, such a motion of the laundry is referred to as a tumbling motion. The third drum rotation speed may be 46 rpm. Since the tumbling motion causes the laundry to fall, it has the same effect as washing the laundry by tapping.

In the water supply step (S22), the rotation of the drum 32 (i.e., rotation at the third drum rotation speed) causing the tumbling motion may be repeated a plurality of times. In this case, a ratio (t31:t32) of a time t31 for which the drum 32 is rotated once and a time t32 for which the drum 32 is stopped once may be 25:9. For example, a pattern in which current is applied to the washing motor for 25 seconds and then cut off for 9 seconds may be repeated.

In the water supply step (S22), the pump 90 may be operated in a speed shifting manner. At this time, a current value applied to the pump motor may vary between 0.5 A and 1.1 A. In the water supply step (S22), the speed shifting operation of the pump 90 may be repeated at regular time intervals. For example, a current having a pattern of increasing from 0.5 A to 1.1 A and then falling back to 0.5 A at least once may be applied to the pump 90 for a predetermined time t41 and then cut off for a predetermined time t42. Here, t41: t42 may be 20:10. For example, a pattern in which current is applied to the pump 90 for 20 seconds and then cut off for 10 seconds may be repeated. A time required for water supply (S22) may be 3 minutes.

After water supply (S22), rinsing (S23) may be performed. During the rinsing (S23), rotation of the drum 32 (i.e., rotation at the third drum rotation speed) causing the tumbling motion may be repeated a plurality of times. At this time, a ratio (t51:t52) of a time t51 for which the drum 32 is rotated once and a time t52 for which the drum 32 is stopped once may be 21:9. For example, a pattern in which current is applied to the washing motor for 21 seconds and then cut off for 9 seconds may be repeated.

During rinsing (S23), the pump 90 may be operated at a fourth pump rotation speed (e.g., the pump rotation speed when the input current of the pump motor is 0.5 A). The fourth pump rotation speed may be the same value as the first pump rotation speed. A current of 0.5 A may be applied to the pump motor. A time required for the rinsing (S23) may be 1 minute. While the rinsing (S23) is being performed, the pump 90 may be continuously operated.

After the rinsing (S23), a second rinsing cycle (S3) may be performed. The second rinsing cycle (S3) may include drainage (S31), water supply (S32), and rinsing (S33).

In the drainage S31, the pump 90 may be operated in a state in which the drain valve is opened. At this time, the pump 90 may be operated in a drain mode to discharge wash water through the drain pipe 19. The drum 32 may be in a stationary state while draining is performed.

In the water supply (S32), a third set amount (e.g., 52 liters (I)) of water is supplied into the tub 31, and in this process, driving the drum 32 at the third drum rotation speed may be performed at least once. In the water supply (S32), a smaller amount of water may be supplied compared to the water supply (S22) described above. The time required for water supply (S32) may be 2 minutes.

The rotation of the drum 32 (i.e., rotation at the third drum rotation speed) causing the tumbling motion during water supply (S32) may be repeated a plurality of times. In this case, a ratio (t61: t62) of a time t61 for which the drum 32 is rotated once and a time t62 for which the drum 32 is stopped once may be 25:9. For example, a pattern in which current is applied to the washing motor for 25 seconds and then cut off for 9 seconds may be repeated.

In the water supply step (S32), the pump 90 may be operated in a variable speed. At this time, a current value applied to the pump motor may vary between 0.5 A and 1.1 A. In the water supply step (S32), a speed shifting operation of the pump 90 may be repeated at regular time intervals. For example, a current having a pattern of increasing from 0.5 A to 1.1 A and then falling back to 0.5 A at least once may be applied to the pump 90 for a predetermined time t61 and then cut off for a predetermined time t62. Here, t61: t62 may be 20:10. For example, a pattern in which current is applied to the pump 90 for 20 seconds and then cut off for 10 seconds may be repeated. A time required for water supply (S32) may be approximately 3 minutes.

During rinsing (S33), the rotation of the drum 32 (i.e., rotation at the third drum rotation speed) causing the tumbling motion may be repeated a plurality of times. In this case, a ratio (t71:t72) of a time t71 for which the drum 32 is rotated once and a time t72 for which the drum 32 is stopped once may be 21:9. For example, a pattern in which current is applied to the washing motor for 21 seconds and then cut off for 9 seconds may be repeated.

During the rinsing (S33), the pump 90 may be operated at the fourth pump rotation speed. The fourth pump rotation speed may be the same as the first pump rotation speed. A time required for the rinsing (S23) may be 1 minute. While the rinsing (S33) is performed, the pump 90 may be continuously operated.

The spin-drying process (S4) may include main spin-drying (S41) and cloth unwinding (S42). The main spin-drying (S41) may be a step of spin-drying laundry by rotating the drum 32 at a preset spin-drying speed. As the laundry rotates while being adhered to the inner surface of the drum 32, spin-drying is performed.

The pump 90 may be operated in a state in which the drain valve is opened. At this time, the pump 90 may be operated in the drain mode to discharge the wash water through the drain pipe 19. In the rinsing and spin-drying step (S21), the drum 32 may be accelerated by stages to reach the spin-drying speed. However, the spin-drying speed may be accelerated at a time without being limited thereto. The spin-drying speed is preferably 750 rpm, but is not necessarily limited thereto. A time required for the main spin-drying (S41) may be approximately 12 minutes.

The cloth unwinding (S42) is to untangle the laundry (cloth) that has been completely spin-dried, and the drum 32 may be rotated to induce a tumbling motion. Specifically, the drum 32 may be rotated at the third drum rotation speed. In this case, a ratio (t81:t82) of a time t81 for which the drum 32 is rotated once and a time t82 for which the drum 32 is stopped once may be 7:3. For example, a pattern in which current is applied to the washing motor for 7 seconds and then cut off for 3 seconds may be repeated.

What is claimed is:

1. A washing machine comprising:
    a tub configured to receive water;
    a drum rotatably provided in the tub;
    a driving unit configured to rotate the drum;
    a water supply unit configured to supply the water from an external water source to the tub;
    a pump that includes a pump motor and is configured to generate a pressurized flow of the water discharged from the tub;
    a nozzle configured to spray the water from the pump into the drum;
    a heater configured to heat the water in the tub; and
    a controller configured to control the driving unit, the water supply unit, the pump motor, and the heater,
    wherein the controller is configured to:
        control the water supply unit to supply the water by a first set amount to the tub,
        control the driving unit to rotate the drum at a first drum rotation speed while the water is being supplied to the tub,
        perform an operation of accelerating a rotation speed of the pump motor from a first pump rotation speed to a second pump rotation speed and then decelerating to the first pump rotation speed at least once while rotating the drum at the first drum rotation speed,
        operate the heater in a state in which the first set amount of water is supplied to the tub,
        control the driving unit to rotate the drum at a second drum rotation speed while operating the heater, and
        rotate the pump motor at a third pump rotation speed awhile rotating the drum at the second drum rotation speed.

2. The washing machine of claim 1, wherein the water supply unit includes:
    a water supply pipe configured to receive the water from the external water source;
    a water supply valve configured to control the water supply pipe; and
    a dispenser that is configured to receive a detergent and is connected to the water supply pipe and the tub.

3. The washing machine of claim 1, wherein the controller is configured to control the driving unit to rotate the drum at the first drum rotation speed to thereby cause laundry positioned at a lowest point in the drum to be raised to a certain height and then be rolled down along an inner surface of the drum.

4. The washing machine of claim 1, wherein the first drum rotation speed is 36 rpm.

5. The washing machine of claim 1, wherein the controller is configured to control the driving unit to alternately rotate and stop the drum at the first drum rotation speed while the water is supplied, and
    wherein a ratio of a rotation time to a stop time of the drum is 6:8.

6. The washing machine of claim 1, wherein a current value applied to the pump motor when rotating the pump motor at the third pump rotation speed is equal to or greater than a current value applied to the pump motor in a section in which the pump motor is accelerated and decelerated.

7. The washing machine of claim 1, wherein the controller is configured to control the driving unit to rotate and stop the drum repeatedly when rotating the drum while operating the heater, and
    wherein the controller is configured to repeat the rotation and stopping of the pump motor and synchronize the rotation and stopping of the pump motor with the rotation and stopping of the drum.

8. The washing machine of claim 7, wherein a ratio of a rotation time to a stop time of the drum while operating the heater is 16:4.

9. The washing machine of claim 1, wherein the second drum rotation speed is greater than the first drum rotation speed.

10. The washing machine of claim 9, wherein the second drum rotation speed is 40 rpm.

11. The washing machine of claim 1, wherein the controller is configured to control the driving unit to rotate the drum at the second drum rotation speed, and then control the driving unit to rotate the drum at a preset spin-drying speed,
wherein the controller is configured to control the driving unit to rotate the drum at a third drum rotation speed while supplying water into the tub after rotating the drum at the spin-drying speed, and
wherein the controller sis configured to perform an operation of accelerating a rotation speed of the pump motor from the first pump rotation speed to the second pump rotation speed and then decelerating to the first pump rotation speed during the rotation of the drum at the third drum rotation speed at least once.

12. The washing machine of claim 11, wherein the third drum rotation speed is greater than the second drum rotation speed.

13. The washing machine of claim 11, wherein the controller is configured to control the driving unit based on the drum rotating at the third drum rotation speed after rotating the drum at the spin-drying speed to thereby repeat drum rotation and stopping alternately at the third drum rotation speed, and
wherein a ratio of a rotation time to a stop time of the drum is 25:9 in a section in which the drum alternately rotates and stops at the third drum rotation speed.

14. The washing machine of claim 13, wherein the controller is configured to repeat rotation and stopping of the pump motor alternately based on accelerating and decelerating the pump motor after rotating the drum at the spin-drying speed, and
wherein a ratio of a rotation time to a stop time of the pump motor is 20:10 based on accelerating and decelerating the pump motor after rotating the drum at the spin-drying speed.

15. The washing machine of claim 11, wherein the controller is configured to rotate the drum at the third drum rotation speed,
wherein the controller is configured to rotate the pump motor at a fourth pump rotation speed after accelerating and decelerating the pump motor, and
wherein the fourth pump rotation speed is the same as the first pump rotation speed.

16. A control method of a washing machine including (i) a drum configured to rotate about a horizontal rotation axis in a tub and (ii) a plurality of nozzles configured to spray water discharged from the tub and circulated by a pump into the drum, the control method comprising:
performing a first drum operation of supplying the water by a first set amount together with a detergent into the tub and rotating the drum at a first drum rotation speed at least once while the water is supplied and performing a pump speed-change operation of accelerating the pump from a first pump rotation speed to a second pump rotation speed and then decelerating to the first pump rotation speed at least once during the first drum operation; and
performing a second drum operation of operating a heater to heat the water in the tub in a state in which the first set amount of water is supplied into the tub, rotating the drum at a second drum rotation speed at least once during the operation of the heater, and performing a pump constant-speed operation of operating the pump at a third pump rotation speed at least once during the second drum operation.

17. The control method of claim 16, wherein performing the second drum operation comprises:
repeatedly rotating the drum at the second drum rotation speed; and
rotating the pump at the third pump rotation speed,
wherein an operation of the pump is synchronized with an operation of the drum each time.

18. The control method of claim 16, further comprising:
performing a first rinsing operation after the second drum operation,
wherein the first rinsing operation includes:
performing a rinsing and spin-drying operation that comprises rotating the drum at a preset spin-drying speed to spin-dry laundry, and
performing a water supply operation that comprises the pump speed-change operation at least once while performing an operation of the drum at a third drum rotation speed and supplying the water into the tub at least once after the rinsing and spin-drying operation.

19. The control method of claim 18, wherein the third drum rotation speed is greater than the second drum rotation speed.

20. The control method of claim 18, wherein the first rinsing operation further includes rotating the pump at a fourth pump rotation speed after the water supply operation, and
wherein the fourth pump rotation speed is the same as the first pump rotation speed.

* * * * *